United States Patent
Kakinami et al.

(10) Patent No.: US 8,077,965 B2
(45) Date of Patent: Dec. 13, 2011

(54) OBJECT RECOGNITION APPARATUS AND OBJECT RECOGNITION METHOD USING EPIPOLAR GEOMETRY

(75) Inventors: Toshiaki Kakinami, Nagoya (JP); Jun Sato, Nagoya (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 1148 days.

(21) Appl. No.: 11/884,728

(22) PCT Filed: Feb. 22, 2006

(86) PCT No.: PCT/JP2006/303165
§ 371 (c)(1), (2), (4) Date: Aug. 21, 2007

(87) PCT Pub. No.: WO2006/090735
PCT Pub. Date: Aug. 31, 2006

(65) Prior Publication Data
US 2008/0137940 A1    Jun. 12, 2008

(30) Foreign Application Priority Data
Feb. 23, 2005    (JP) ............... P2005-047516

(51) Int. Cl.
*G06K 9/00* (2006.01)
*G06K 9/46* (2006.01)
*G06K 9/50* (2006.01)
*B60Q 1/00* (2006.01)
*G01C 3/00* (2006.01)
*G01C 3/08* (2006.01)
*G01C 5/00* (2006.01)

(52) U.S. Cl. ........ 382/154; 356/3.14; 340/435; 340/436

(58) Field of Classification Search .................. None
See application file for complete search history.

(56) References Cited

U.S. PATENT DOCUMENTS
7,038,577 B2 *    5/2006    Pawlicki et al. .............. 340/435
(Continued)

FOREIGN PATENT DOCUMENTS
JP    5-114099 A    5/1993
(Continued)

OTHER PUBLICATIONS

Pritchett et al., "Matching and Reconstruction from Widely Separated Views", 3D Structure from Multiple Images of Large-Scale Environments, Lecture Notes in Computer Science, 1998, vol. 1506/1998, 78-92.*

(Continued)

*Primary Examiner* — Tom Y Lu
*Assistant Examiner* — Thomas Conway
(74) *Attorney, Agent, or Firm* — Sughrue Mion, PLLC

(57) ABSTRACT

An object recognition apparatus that processes images, as acquired by an imaging means (10) mounted on a moving object, in a first image plane and a second image plane of different points of view, and recognizes an object in the vicinity of the moving object. The object recognition apparatus comprises: a feature point detection means (42) that detects feature points in first and second image planes of an object image; a fundamental matrix determination means (43*a*) that determines, based on calculation of an epipole through the auto-epipolar property, a fundamental matrix that expresses a geometrically corresponding relationship based on translational camera movement, with not less than two pairs of feature points corresponding between the first and second image planes; and a three-dimensional position calculation means (43*b*) that calculates a three-dimensional position of an object based on the coordinates of the object in the first and second image planes and the determined fundamental matrix.

10 Claims, 10 Drawing Sheets

U.S. PATENT DOCUMENTS

| | | | |
|---|---|---|---|
| 7,154,395 B2 * | 12/2006 | Raskar et al. | 340/572.4 |
| 7,251,356 B2 * | 7/2007 | Seo et al. | 382/154 |
| 7,440,585 B2 * | 10/2008 | Roh et al. | 382/103 |

FOREIGN PATENT DOCUMENTS

| | | |
|---|---|---|
| JP | 2001-187553 A | 7/2001 |
| JP | 2004-198211 A | 7/2004 |

OTHER PUBLICATIONS

Supplementary European Search Report issued in European Application No. 06714305.7-2218/1852673 dated Jul. 7, 2010 (8 pages).

Prattichizzo, Domenico, et al., "Epiploar Gemoetry and Visual Servoing," Jul. 14, 2003, Retrieved from the Internet: URL:http://ww.prixma.unina.it/cira03/MP_Prattichizzo.pdf, retrieved on Jun. 17, 2010, pp. 2-5 and 7-9.

Zhang, Z., "Determining the Epipolar Gemoetry and its Uncertainty: A Review," International Journal of Computer Vision, Kluwer Academic Publishers, Norwell, U.S., LNKD- DOI:10.1023/A:1007941100561, vol. 27, No. 2, Mar. 1, 1988, pp. 161-195, Sections 3.2.4 and 3.4.

Piazzi, J., et al., "Auto-epipolar Visual Servoing,:" Intelligent Robots and Systems, 2004 (IROS 2004) Proceedings, 2004 I EEE/RSJ International Conference on Sendai, Japan Sep. 29-Oct. 2, 2004, Piscataway, NJ, USA, IEEE, Piscataway, NJ, USA LNKD-DOI:10.1109/IROS.2004.1389379, vol. 1, Sep. 29, 2004, pp. 363-368.

Phillip Torr, Motion Segmentation and Outlier Detection, University of Oxford, 1995, pp. 58-60.

Jun Sato et al., Kyokumenjo no Epipolar Geometry to Mikosei Camera ni yoru Shikaku Yudo, The Transactions of the Institute of Electronics, Information and Communication Engineers D-II, Sep. 25, 1999, pp. 1401 to 1410, vol. J82-D-II, No. 9.

* cited by examiner

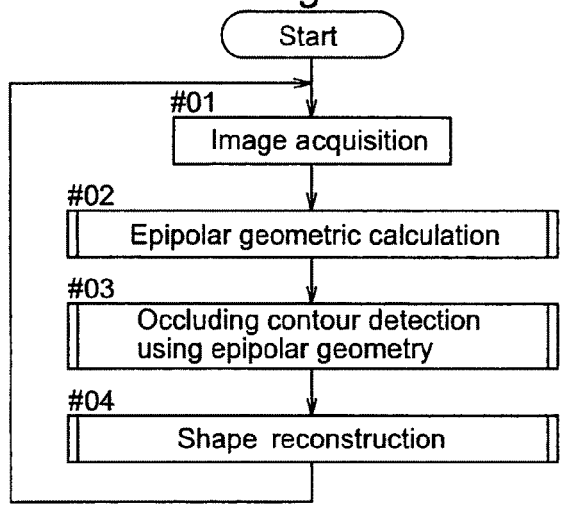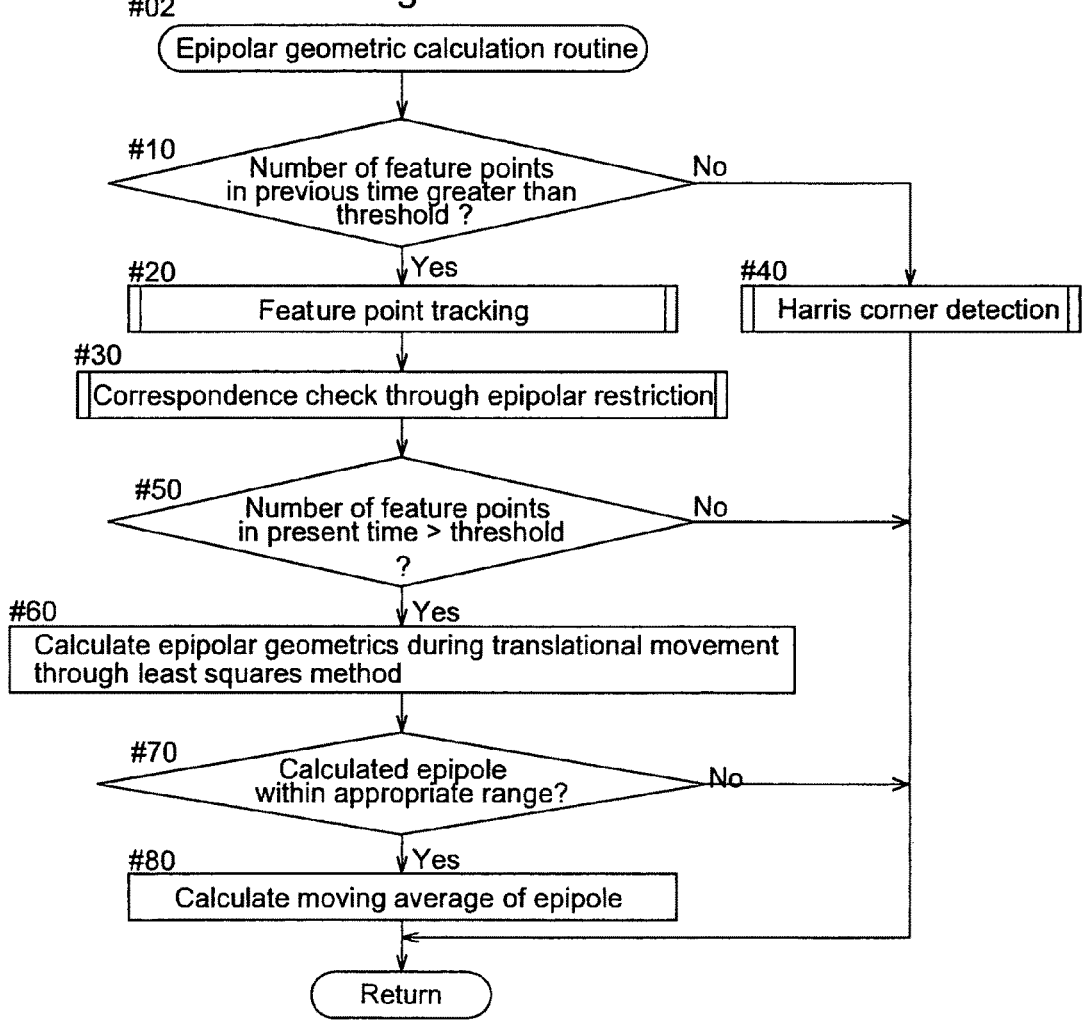

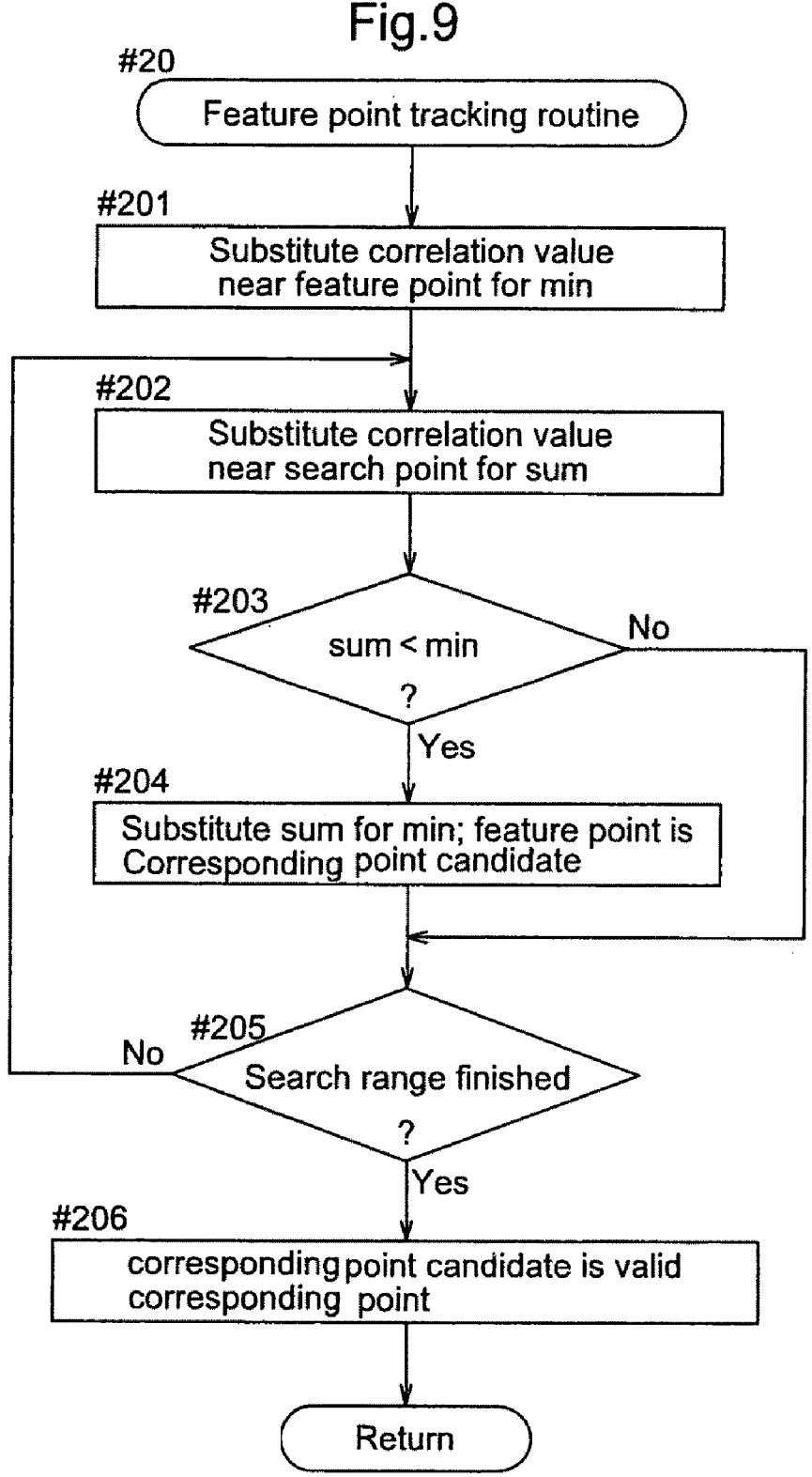

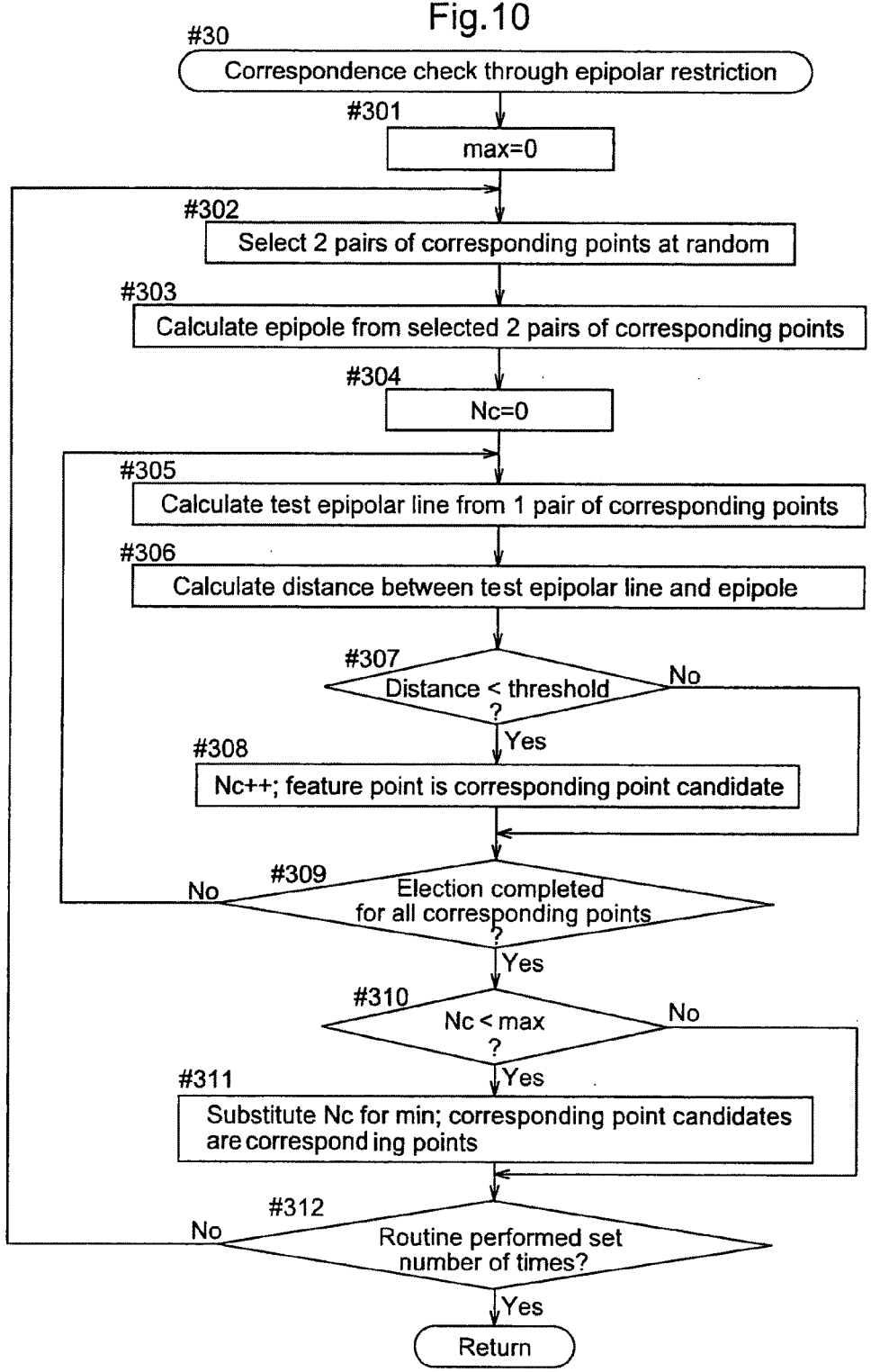

Fig. 14
(a) 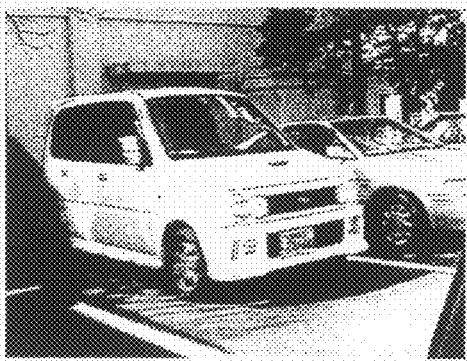
captured image
(b) 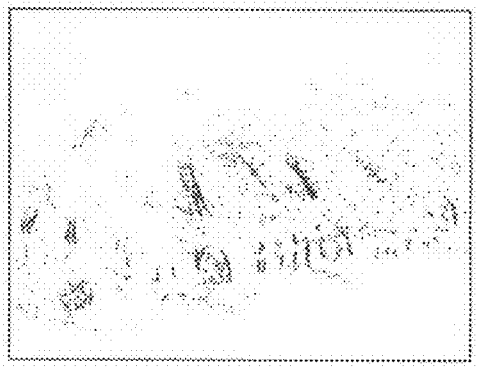
3D reconstruction
Fig. 15
(a) 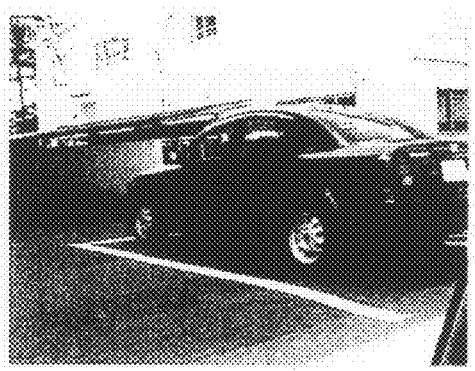
captured image
(b) 
3D reconstruction

OBJECT RECOGNITION APPARATUS AND OBJECT RECOGNITION METHOD USING EPIPOLAR GEOMETRY

TECHNICAL FIELD

The present invention relates to object recognition technology that processes images, as acquired by an imaging means mounted on a moving object, in a first image plane and a second image plane of different points of view, and recognizes an object in the vicinity of the moving object.

BACKGROUND ART

A technology used in an object recognition apparatus is known, in which a first image plane and a second image plane of different points of view are created by two cameras arranged parallel to one another on the left and right with a predetermined space in between; the amount of displacement between corresponding parts of the object image in the respective image planes is calculated; and the perpendicular length from the object to a straight line that connects the left and right cameras is found based on the amount of displacement using the principle of triangulation (for example, refer to Patent Document 1). With this object recognition technology, it is necessary to arrange the left and right cameras in an accurate position so as to obtain a stereo image; deviation in the position of the left and right cameras leads to error in the calculation of position coordinates. When such an object recognition apparatus is mounted on an automobile or the like, the degree of freedom with which the cameras can be positioned is not high, and therefore it is necessary for the accuracy of the camera mounting to meet stringent conditions.

A technology is known in which a first image plane and a second image plane of different points of view are created from images captured by a single camera before and after movement; the amount of displacement between corresponding parts of the object image in the first image plane and the second image plane, conversion processing compensating for the camera movement having been performed on the second image plane, is calculated; and the perpendicular length from the object to a straight line that connects the left and right cameras is found based on the amount of displacement using the principle of triangulation (for example, see Patent Document 2). With this object recognition technology, image planes from before and after movement of a single camera are used, and thus accuracy in mounting the camera is not particularly demanded. However, in order to find the position coordinates of the object, the position coordinates of the object are calculated based on the amount of displacement between corresponding parts of the object image in the first image plane and the second image plane, and the object is reconstructed; therefore, there is a problem in that the structure of the curved surface portions of the object cannot be reconstructed. Note that this problem also arises in the technology disclosed in Patent Document 1.

A method is known, in the technological field called "computer vision", in which, when finding the fundamental matrix (also called "F-matrix") as a conversion matrix of points corresponding between two images obtained from different points of view, 8 pairs of corresponding points are first taken at random from N pairs of corresponding points, and using the F-matrix found using the 8 pairs of corresponding points, an epipolar line for points in the second image plane that correspond to the points in the first image plane is calculated. Next, a series of processes, in which a distance d between the corresponding points in the second image plane and the epipolar line is found, and the discrete value of pairs of corresponding points in which the distance d is not greater than a certain threshold value is found, is repeated for a set number of times while taking the 8 pairs of corresponding points at random, so that the final F-matrix is an F-matrix in which the discrete values are maximum (for example, refer to Non-Patent Document 1). With this method, not less than 8 pairs of corresponding points are necessary in order to find the F-matrix, and thus a problem arises, particularly when applying this method to an object recognition apparatus for a moving object such as an automobile, in that stable detection and tracking is difficult.

Patent Document 1: JP H5-114099A (paragraphs 0016-0020; FIGS. 3, 4, 5)
Patent Document 2: JP 2001-187553A (paragraphs 0042-0066; FIGS. 4 and 8)
Non-Patent Document 1: Torr, Philip: *Motion Segmentation and Outlier Detection*. University of Oxford: 1995, pp. 58-60.

DISCLOSURE OF INVENTION

Problem to be Solved by the Invention

As indicated by the abovementioned conventional technology, with a conventional object recognition apparatus that processes images, as acquired by an imaging means mounted on a moving object, in a first image plane and a second image plane of different points of view, and recognizes an object in the vicinity of the moving object, stable recognition and tracking are difficult in the case where the surface of the object to be recognized has poor texture, such as in the case of the nose and rear of an automobile or the curb of the road, and the object to be detected has a curved surface; furthermore, there is a problem in that corresponding point search processing, for performing recognition while tracking feature parts within an image that changes from time to time using the conventional stereo method, takes too much time. Therefore, the problem to be solved by the present invention is to provide object recognition technology for a moving object and particularly for an automobile, the object recognition technology being capable of stable recognition even with a small computational load, and being capable of stable recognition of even objects with no surface texture.

Means for Solving Problem

In order to solve the abovementioned problems, an object recognition apparatus according to the present invention processing images, as acquired by an imaging means mounted on a moving object, in a first image plane and a second image plane having different points of view, and recognizing an object in the vicinity of the moving object, and comprises: a feature point detection means detecting feature points of a object image in the first image plane and the second image plane; a fundamental matrix determination means determining a fundamental matrix expressing a geometrically corresponding relationship, based on translational camera movement, between the first image plane and the second image plane, from not less than two pairs of feature points corresponding between the first image plane and the second image plane, on the basis of calculation of epipoles through auto-epipolar property; and a three-dimensional position calculation means calculating a three-dimensional position of the object based on the coordinates of the object in the first image plane and the second image plane and the determined fundamental matrix.

With this configuration, regardless of whether the first image plane and second image plane that show the captured object image were created by an imaging means comprising a single camera or an imaging means comprising two cameras, respective feature points that correspond between the first image plane and the second image plane, or in other words, a fundamental matrix determining conversion between corresponding points, can be found based on calculation of the epipole through auto-epipolar property, as long as the relationship between the first image plane and the second image plane is the same as the relationship in translational camera motion. Therefore, as shall be explained in detail later, as few as two pairs of feature points corresponding between the first image plane and the second image plane (corresponding points) may be used. Through this, an object recognition apparatus capable of stable recognition even with a small computational load is realized.

In the case where an imaging means that creates the first image plane and the second image plane using a single camera is employed, the image planes, as captured before and after the translational motion of the camera that accompanies the motion of the moving object, are a first image plane and a second image plane that have a geometrical relationship based on the translational camera movement. In the case where the moving object is a vehicle such as an automobile, the movement (motion) over a short interval of time is considered translational movement (translational motion) because the inertia of the moving object is high; therefore, such an object recognition apparatus can be effectively applied in an automobile.

Note that employing an imaging means that creates the first image plane and second image plane using two cameras is not excluded from the scope of the present invention; in such a case, the image planes as captured by the two cameras at the same time are the first image plane and the second image plane. Any geometrical arrangement of the two cameras may be used as long as the arrangement fulfills a geometrical condition based on translational movement; the degree of freedom with which the cameras can be arranged is high compared to a stereo camera method based on the translational and rotational movement of a plurality of cameras, which is advantageous when applying the object recognition apparatus in an automobile or the like where there is a limitation on where the cameras can be mounted.

In the case where the feature point detection means is configured so as to detect an occluding contour of the object and detect points positioned on the contour lines of the occluding contour as the feature points, it is possible to detect feature points of the object based on the occluding contour in the object image and reconstruct a three-dimensional shape, even when the object to be detected does not have a texture. Because the occluding contour, which is the border between an object and its background, is used instead of the surface texture of the object, it is possible to stably reconstruct a shape particularly in which the target object has a poor surface texture and also has a curved surface, such as a vehicle or the like.

In the case of detecting the occluding contour using epipolar geometry, it is preferable to detect and track the feature points of the object in the image acquired by the imaging means as well as to determine a fundamental matrix using the epipole found from the feature points through epipolar geometry; however, more reliable occluding contour detection is possible by applying a Gaussian differential filter to the image to be processed, as stored in a frame memory at the time of occluding contour detection, on the direction of the epipole.

It is preferable to configure the fundamental matrix determination means so as to generate temporary fundamental matrices, take feature points in which the distance between a straight line connecting the feature points corresponding to one another in the first image plane and the second image plane and the epipole is less than or equal to a predetermined value as properly-corresponding feature points, and determine the temporary fundamental matrix in which the number of properly-corresponding feature points is greatest as an official fundamental matrix. In other words, the first image plane and second image plane being in a geometrical relationship based on translational movement, an "auto-epipolar" property, in which the straight lines that connect corresponding points to one another intersect with a point called the "epipole", is obtained; thus, in the case where the straight line connecting corresponding points to one another is significantly off from the epipole, that pair of corresponding points can be thought of as having erroneous correspondence. Using this, an F-matrix is calculated using two pairs of corresponding points (feature points in the first image plane and second image plane that correspond to one another) taken at random; then, the discrete value of a pair of corresponding points in which the distance between the epipole found from the F-matrix (a pseudo epipole) and a straight line connecting the corresponding points is not greater than a certain threshold is found. The above processing is repeated for a set number of times while taking two pairs of corresponding points at random, so that an F-matrix in which the discrete values are maximum is determined to be the final F-matrix. With this algorithm, the F-matrix is computed while erroneous correspondence is eliminated in a stable manner, and thus processing speed can be improved.

The object recognition apparatus according to the present invention is capable of stable recognition of even objects with no surface textures, even with a small computational load; when the object recognition apparatus is applied in an automobile, where the bumper of an automobile present in the vicinity is to be recognized, and the feature point detection means is configured to detect the occluding contour of the bumper, the object recognition apparatus of the present invention can contribute to the automation of parking the automobile, parking the automobile in a garage, and the like.

Furthermore, an object recognition method processing images, as acquired by an imaging means mounted on a moving object, in a first image plane and a second image plane having different points of view, and recognizing an object in the vicinity of the moving object, also falls within the scope of the present invention; such an object recognition method comprises: a step of detecting feature points of a object image in the first image plane and the second image plane; a step of determining a fundamental matrix expressing a geometrically corresponding relationship, based on translational camera movement, between the first image plane and the second image plane, from not less than two pairs of feature points corresponding between the first image plane and the second image plane, on the basis of calculation of epipoles through auto-epipolar property; and a step of calculating a three-dimensional position of the object based on the coordinates of the object in the first image plane and the second image plane and the determined fundamental matrix. It goes without saying that such an object recognition method can achieve the same essential effects as the abovementioned object recognition apparatus of the present invention, and the same advantageous effects can be obtained therefrom.

In addition, a program that causes a computer to execute such an object recognition method, a medium on which such a program is recorded, and the like also fall within the scope of the present invention.

These and other features, advantages, and the like shall be made clear through the following descriptions and drawings referred to therein which illustrate an exemplary embodiment of the present invention.

BEST MODE FOR CARRYING OUT THE INVENTION

First, the theoretical background of the present invention shall be explained.

In the present invention, occluding contours are used as the main image feature of the object to be detected (hereafter, also referred to simply as "target object") acquired by the imaging means. The "occluding contours" are, as shown in FIG. 1, contours arising in the image in which the target object occludes the background. Even when a target object has no surface texture, such occluding contours can be observed as long as a luminance difference between the target object and the background is present; therefore, the occluding contours can be used as an image feature for the target object regardless of the presence/absence of textures. However, many objects are made up of curved surfaces; therefore, occluding contours differ from feature points such as corners in that lines are curved, and thus it is difficult to find the correspondence between points on occluding contour curves obtained from image surfaces having different points of view. Accordingly, the present invention employs a method in which the correspondence of points on an occluding contour in different points of view is found through epipolar geometry and the shape of a three-dimensional object is reconstructed.

With this method, first, it is necessary to stably find an F-matrix (fundamental matrix) that expresses the epipolar geometry between images found in two image planes having two differing points of view. Assuming that the projection points obtained when the same point in three-dimensional space is projected onto two such image planes (first image plane and second image plane) are $m=[u, v]^T$ and $m'=[u', v']^T$ respectively, the epipolar formula shown below generally holds true therebetween.

[Formula 1]

$$\tilde{m}'^T F \tilde{m} = 0 \quad (1)$$

Here, the ~ is a symbol expressing homogenous coordinates, and the "T" superscript is a symbol expressing a transposed matrix. The matrix F (fundamental matrix) is a 3×3 matrix with a degree of freedom of 7.

In general, a minimum of 8 corresponding points are necessary when finding the F-matrix through linear computation, and a minimum of 7 corresponding points are necessary when finding the F-matrix through a non-linear solution; several more corresponding points are necessary in order to obtain an F-matrix with some stability. However, in actuality, it is extremely difficult to constantly track ten or so corresponding points within an image, and therefore in the present invention, a restriction is placed on the movement of the moving object (typically, a vehicle such as an automobile) onto which a camera is fixed as an imaging means, and based on this, a more stable F-matrix is found from fewer corresponding points. In general, a vehicle has a high inertia, and thus can be thought of as moving in an approximately a straight line over a short period of time. Thus, the movement of the camera fixed on the vehicle over a short period of time can also be thought of as genuine translation movement.

In the case where the same camera is in translational movement, the F-matrix between images obtained before and after the movement has a form such as shown in Formula 2, and, excluding scaling ambiguity, has a degree of freedom of only 2.

[Formula 2]

$$F = \begin{bmatrix} 0 & a & b \\ -a & 0 & c \\ -b & -c & 0 \end{bmatrix} \quad (2)$$

Therefore, in the case where the movement of the vehicle-mounted camera is assumed to be translational movement, epipolar geometries are found through finding the F-matrix with a degree of freedom of 2 indicated in the formula (2), and thus it is possible to find the corresponding points on an occluding contour curve based on an epipolar line as described earlier.

The F-matrix in the formula (2) can be found linearly from not less than two pairs of corresponding points, in the manner explained hereinafter. Here, it is assumed that N pairs of corresponding points $m_i=[u_i, v_i]^T$, $m'_i=[u'_i, v'_i]^T$ (i=1, ..., N) within the images are obtained. Formula (2) is substituted in formula (1), and the elements of the found F-matrix $f=[a, b, c]^T$ are adjusted, resulting in the following formula.

[Formula 3]

$$Mf=0 \quad (3)$$

Here, M is the N×3 matrix shown below.

[Formula 4]

$$M = \begin{bmatrix} v_1 u'_1 - u_1 v'_1 & u'_1 - u_1 & v'_1 - v_1 \\ \vdots & \vdots & \vdots \\ v_N u'_N - u_N v'_N & u'_N - u_N & v'_N - v_N \end{bmatrix} \quad (4)$$

At this time, the least squares solution of f is found as an eigenvector corresponding to the minimum eigenvalue of $M^T M$, leaving scaling ambiguity. However, in actuality, erroneous correspondence is present among corresponding points, and thus there are cases where the F-matrix obtained by simply finding the least squares solution using all found corresponding points includes a high degree of error. Therefore, a method is introduced in which the F-matrix is found through the least squares method after removing such erroneously corresponding points. A RANSAC (RANdom SAmple Consensus) method, in which the process includes selecting a minimum number of points required for fitting, fitting a straight line thereto, and checking to what degree the other points fit that straight line, is used as a method to remove erroneously corresponding points.

At this time, in the present invention, since the movement of the camera is limited to translational movement and the F-matrix is calculated from images of two successive times, the camera movement is low, and therefore an algorithm such as the following is used.

As the movement of the camera is assumed to be genuinely translational, the F-matrix can be found with a minimum of two pairs of corresponding points. Therefore, first, two pairs of corresponding points are taken at random from N pairs of corresponding points, and an F-matrix is found through formula (3) using the two pairs of corresponding points.

In general, when the epipolar line $l'_i$ in the second image plane is calculated for the corresponding point $m_i$ in the first image plane and the distance between the epipolar line $l'_i$ and the corresponding point $m'_i$ in the second image is calculated using the F-matrix found in this manner, the amount of camera movement is low; thus, as shown in FIG. 2, the distance d for all points $m'_i$ falls below a threshold, and erroneous correspondence cannot be eliminated even when erroneous correspondence occurs. For this reason, in the present invention, erroneous correspondence is stably eliminated using the property by which the epipolar geometries of the translationally-moving camera are auto-epipolars.

In other words, in the case of a translationally-moving camera, when images of before and after the movement are superimposed upon one another, the straight lines that connect corresponding points to one another intersect at a single point, as can be seen in FIG. 3; this point of intersection is the epipole. This property is called "auto epipolarity", an explanation of which can found in, for example, Jun Sato, "Computer Vision—Visual Geometry"; Corona Ltd., May 7, 1999; pp. 101-109. Based on this auto-epipolar property, it can be thought that, in the case where a straight line connecting corresponding points to one another is significantly off the epipole, erroneous correspondence has occurred in that pair of corresponding points.

Accordingly, two pairs of corresponding points are taken at random, and the F-matrix is found through formula (3) using the two pairs of corresponding points; after this, an epipole e is found from this F-matrix. Next, a straight line $l_i$ connecting a corresponding point $m_i$ in the first image with a corresponding point $m'_i$ in the second image is found, the distance d between the straight line $l_i$ and the epipole e is calculated, and the discrete value $N_c$ of the pair of corresponding points in which the distance d is no greater than a threshold is found.

The above processing is repeated for a set number of times while taking two pairs of corresponding points at random, so that an F-matrix in which the discrete value $N_c$ is maximum is found. In this manner, it is possible to calculate an F-matrix while stably removing erroneous correspondence from a translationally-moving camera having little camera movement.

A method for reconstructing a three-dimensional shape from occluding contours using the F-matrix found through the above-mentioned algorithm shall be explained hereafter.

In the case where the three-dimensional object is an object having a curved shape, such as a vehicle, a person, or the like, there are no points on the occluding contour curves obtained from differing viewpoints that physically correspond. However, in the case where images have been obtained in a short time interval or through camera movement, it can be safely said that approximately the same three-dimensional point is projected as the occluding contour in different points of view. Furthermore, assuming that the camera is undergoing translational movement, the auto-epipolar property holds true, and thus corresponding points appear on the same epipolar line when images of different points of view are superimposed on one another. Accordingly, as shown in FIG. 5, in two successive images, the points m and m', which are on occluding contour lines and are on the same epipolar line l, can be thought of as corresponding to one another. In this manner, it is possible to find the corresponding relationship between points on occluding contours from two successive times using epipolar geometry, and it is possible to reconstruct a three-dimensional shape using the obtained corresponding points.

Actual three-dimensional reconstruction is performed as follows: first, an essential matrix (also referred to as an "E-matrix" hereinafter) is computed using an internal parameter matrix A from the F-matrix; this E-matrix is decomposed and the three-dimensional camera movement (rotation and translation) is calculated; and three-dimensional coordinates are calculated based on the calculated camera movement between the two images and the corresponding points m and m' on the occluding contours obtained through epipolar geometry.

Hereafter, an example of an object recognition apparatus according to the present invention, which is configured putting the abovementioned theory behind the present invention into practice, shall be described with reference to the drawings.

The object recognition apparatus is installed in a vehicle, particularly in an automobile, and is configured, as shown in FIG. 6, of: a single digital camera 10 as an imaging means; an image input unit 20 that receives an image signal from the digital camera 10; a frame memory 30 that temporarily stores the digitized image data; an image processing unit 40 that performs various image processing on the acquired image data; an image output unit 50 that outputs the image signal to a monitor or the like (not shown); and a control unit 60 that controls the various functional elements included in the object recognition apparatus in accordance with an input signal from the sensor or the like and outputs the control result. The image processing unit 40 includes an image data control unit 41, a feature extraction unit 42, and a recognition processing unit 43.

A microcomputer 61 detects vehicular motion of a predetermined distance based on a vehicular motion signal inputted to the control unit 60 from a wheel speed sensor 70 or the like that functions as a moving object position information acquisition means; the image data obtained when the image input unit 20 performs synchronizing separation and A/D conversion, which are functions that the image input unit 20 has, on the image signal from the camera 10 is stored in the frame memory 30 for every predetermined length of movement. For example, the image data before movement of the predetermined length is an image formed from the first image plane, and the image data after movement of the predetermined length is an image formed from the second image plane. At this time, the first image plane and second image plane are considered as having a geometric relationship based on translational camera movement when the vehicular movement is of a short distance (for example, approximately 10 cm).

A part of an image included in a desired image plane is read out from among the image data stored in the frame memory 30 based on address specification performed by the image data control unit 41, and feature points on the contour lines and corners in the image are detected by the feature extraction unit 42, which functions as a feature point detection means. Various algorithms may be used for feature extraction, but here, Harris's corner detection shall be employed.

The recognition processing unit 43 includes, implemented as a program: a fundamental matrix determination means 43a that determines, based on the calculation of an epipole based on auto-epipolar property, a fundamental matrix expressing a geometrically corresponding relationship from no less than two pairs of feature points that correspond between the aforementioned first image plane and second image plane based on the translational camera movement between the two images; and a three-dimensional position calculation means 43b that calculates a three-dimensional position of a target object based on the fundamental matrix and the coordinates of the target object in the first image plane and the second image plane.

With the recognition processing unit 43 configured in this manner, calculation of the F-matrix based on auto-epipolar property and erroneous corresponding point removal in accordance with the aforementioned algorithm are performed using groups of feature points detected between two successive image planes, or in other words, between a first image plane and a second image plane in which the points of view differ, and three-dimensional coordinates are calculated through triangulation using only groups of points that correspond correctly. In other words, the recognition processing unit 43 functions as an F-matrix (fundamental matrix) determination means. When the calculated three-dimensional coordinates are transferred to a rendering unit 51 of the image output unit 50, two-dimensional stereoscopic image data is created based on the three-dimensional coordinates; this image data is then converted into an image signal by a display controller 52. Image data from the frame memory 30 is inputted into the display controller 52, and therefore, by supplying the image signal from the display controller 52 to a monitor, a stereoscopic image of the image captured by the camera 10 and the object recognized by the image processing unit 40 can be displayed in the monitor.

Note that here, in the case where the three-dimensional object has a curved shape, such as a vehicle, a person, or the like, there are no points on the occluding contour curves obtained from differing viewpoints that physically correspond, as shown in FIG. 4; however, in the case of images acquired in a short time interval or images acquired before and after translational movement by the camera, approximately the same three-dimensional point is considered to be projected as the occluding contour in different points of view.

A flow of processing in the object recognition apparatus configured as described above, from imaging of an object to three-dimensional reconstruction, shall be explained hereafter using the flowcharts of FIGS. 7 to 13.

FIG. 7 shows a basic flowchart; images acquired by the camera 10 in response to a trigger signal generated by the control unit 60 at a predetermined timing are sequentially stored in the frame memory 30 (#01). Feature points of the target object in the images loaded from the frame memory 30 into the image processing unit 40 are detected and tracked, the epipole is found based on epipolar geometric calculation, and an F-matrix is obtained (#02). Occluding contour detection is performed using epipolar geometry (#03). From the coordinates of corresponding points on the detected occluding contours, the three-dimensional coordinates of those points are calculated, and a three-dimensional shape is reconstructed from the calculated three-dimensional coordinates (#04). This three-dimensional reconstruction is performed as follows: first, an E-matrix is computed using an internal parameter matrix A from the calculated F-matrix; this E-matrix is decomposed and the three-dimensional camera movement is calculated; and three-dimensional coordinates are calculated based on the calculated camera movement between the two images and the corresponding points m and m' on the occluding contours obtained through epipolar geometry.

The epipolar geometry calculation routine in the above step #02 shall be explained using the flowchart in FIG. 8.

First, it is determined whether or not the number of feature points in the image plane acquired the previous time exceeds a threshold (#10). In the case where the number of feature points exceeds the threshold (Yes in #10), the process enters a feature point tracking routine (explained later) that determines whether or not a feature point is a valid feature point (#20); then, the process enters a correspondence check routine based on epipolar restriction (explained later) that finds the epipole and evaluates the corresponding points based on epipolar restriction (#30). In the case where the number of feature points is less than or equal to the threshold (No in #10), the process runs through a Harris corner detection routine (explained later) that detects feature points based on corner detection (#40), and then returns.

Next, it is determined whether or not the number of feature points in the image plane acquired the present time exceeds the threshold (#50). In the case where the number of feature points exceeds the threshold (Yes in #50), epipolar geometries at the time of translational movement are calculated through the least squares method, and the epipole is found (#60). It is determined whether the epipole found is within an appropriate range (#70), and in the case where the epipole is within the appropriate range (Yes in #70), the moving average of the epipole found is calculated (#80), and the routine returns. In step #50, in the case where the number of feature points is less than or equal to the threshold (No in #50), and in step #70, in the case where the epipole is not within the appropriate range (No in #70), the routine ends and returns as-is.

The feature point tracking routine of step #20 shall be explained hereafter using the flowchart in FIG. 9.

First, a correlation value neighbor the feature point is substituted for the variable: min (#201). A correlation value near the search point is substituted for the variable: sum (#202). The variable: sum and variable: min are compared, and in the case where the variable: min exceeds the variable: sum (Yes in #203), the value of the variable: sum is substituted for the variable: min, and the feature point is taken as a corresponding point candidate (#204). In the case where the variable: min is less than or equal to the variable: sum (No in #203), the routine skips step #204. The processing from step #202 to step #204 is repeated within a search range (#205), and when all processing within the search range has finished, the corresponding point candidate is taken as a valid corresponding point (#206), and the routine returns.

The correspondence check routine based on epipolar restriction of step #30 shall be explained hereafter using the flowchart in FIG. 10.

First, as an initial setting, 0 is substituted for a variable: max (#301); two pairs of corresponding points are then selected at random (#302); and the epipole is calculated from the selected two pairs of corresponding points (#303). Furthermore, 0 is substituted for a variable: Nc that indicates a discrete value (#304); a test epipolar line is then calculated from a single pair of corresponding points (#305); and the distance between the test epipolar line and the epipole is calculated (#306). The obtained distance is compared to a threshold (#307); in the case where the distance is less than the threshold (Yes in #307), the corresponding points are taken as corresponding point candidates, and the variable: Nc is incremented (#308); in the case where the distance is greater than or equal to the threshold (No in #307), the process in step #308 is skipped. The processing from step #305 to step #308 is repeated for all corresponding points (No in #309). When the processing has finished for all corresponding points (Yes in #309), the variable: Nc and the variable: max are compared (#310). In the case where the variable: Nc is less than the variable: max (Yes in #310), the corresponding point candidates are taken as corresponding points, and the value of the variable: Nc is substituted for the variable: max (#311). In the case where the variable: Nc is greater than or equal to the variable: max (No in #310), the process of step #311 is skipped. The routine returns after the processing from step #302 to step #311 has been performed a set number of times (#312).

The Harris corner detection routine of step #40 shall be explained hereafter using the flowchart in FIG. 11.

First, a Gaussian differential filter is applied to the target image data in the X and Y directions, and a Gaussian differential is calculated (#401). The corner strength (utilizing an evaluation function called CRF) in each pixel is calculated (#402). Feature point candidates are specified based on the differential calculation value (#403), and the specified feature point candidates are sorted using the CRF as a reference (#404). A process which assigns feature points in order from candidates with high CRFs down (#405) is repeated until the required number of feature points are obtained (No in #405), and the routine returns when the necessary number of feature points have been obtained (Yes in #405).

An occluding contour detection routine using epipolar geometry in the basic flowchart of FIG. 7 shall be explained using the flowchart in FIG. 12.

A Gaussian differential filter is applied to the target image data in the epipolar direction, and a Gaussian differential is calculated (#31). A computational map of the obtained differential values is scaled (#32); using this, the differential image is thinned (#33) and the routine returns.

The shape reconstruction routine in the basic flowchart of FIG. 7 shall be explained using the flowchart in FIG. 13.

First, observed feature points are sequentially specified from a group of feature points, and it is determined whether or not an observed feature point is a reconstruction candidate point (#41). In the case where the observed feature point is a reconstruction candidate point (Yes in #41), a corresponding point in the next time is estimated (#42), and when a corresponding point is present in the next time (Yes in #43), that observed feature point is taken as a reconstruction-capable feature point (#44). In the case where the observed feature point is not a reconstruction candidate point (No in #41), a corresponding point in the next time is searched for (#45), and when a corresponding point is present in the next time (Yes in #46), that observed feature point is taken as a reconstruction-capable feature point (#47). When the processing from step #41 to step #47 is performed for all feature points (Yes in #48), the routine moves to the next step. Using an F-matrix, or to be accurate, an E-matrix, the reconstruction-capable feature points obtained through the aforementioned processing are inverse-projected in three-dimensional space (#49), and the three-dimensional coordinates of the intersection point of the straight lines are calculated (#50). Steps #49 and #50 are repeated for all reconstruction-capable feature points (No in #51), and when the processing for all reconstruction-capable feature points finishes (Yes in #51), the routine returns. Three-dimensional display image data of the target object is generated by sending the three-dimensional coordinates obtained here to the rendering unit 51.

An experimental example in which the object recognition apparatus as described thus far is provided in an automobile, and using the object recognition apparatus, epipolar geometric calculations are performed based on successive images obtained when traveling alongside a parking space, and a three-dimensional shape of the place that was passed by is reconstructed. In the scene that has been passed by, three vehicles are parked in the parking space, and next, there is open space, and a single vehicle is parked. The result of performing three-dimensional reconstruction of the three parked vehicles is indicated in FIG. 14, in which FIG. 14 (a) is the captured image, and FIG. 14 (b) is the three-dimensionally reconstructed image. Furthermore, the result of performing three-dimensional reconstruction of the one parked vehicle is indicated in FIG. 15, in which FIG. 15 (a) is the captured image, and FIG. 15 (b) is the three-dimensionally reconstructed image. It can be seen, in FIG. 14 (b), that based on the three-dimensional shape of the vehicles, a distinction between each of the successively parked cars can generally be made. In addition, in FIG. 15 (b), it is clear that a three-dimensional outline of a vehicle parked with its nose turned away has, for the most part, been accurately reconstructed. Furthermore, a distinction between the space in which the parked vehicle is present and the space in which the parked vehicle is not present can generally be made.

Despite being the part of an automobile that protrudes the most in the front and rear, recognition of a bumper, which is a curved surface that has no texture, has conventionally been difficult. However, recognition of a bumper is possible through a method in which correspondence based on epipolar geometry is implemented and a three-dimensional shape is recognized based on occluding contours, as is particularly evident from FIG. 15 (b). Therefore, the present invention can be applied effectively for the purpose of recognizing obstructions, and bumpers in particular, during parking and transit.

With the present invention, a three-dimensional shape of an obstruction in the vicinity of a vehicle can be reconstructed at a low computational cost. In particular, by reconstructing the three-dimensional shape from an occluding contour of an obstruction with little texture, such as a parked vehicle or the like through the implementation of correspondence based on epipolar geometry, a three-dimensional shape can be reconstructed even for an obstruction that has no texture. In other words, because the occluding contours are curves, finding the correspondence between occluding contours obtained at different times is not easy; however, by using epipolar geometry, correspondence between points on the occluding contours is found. At this time, in order to find the epipolar geometries in a stable manner, the fact that the movement of a vehicle in a short interval of time can be approximated as essentially translational movement is used to calculate epipolar geometries limited to translational movement, and the auto-epipolar property is introduced to avoid a high computational load for reducing erroneous correspondence in feature points between images of plural points of view, thereby eliminating erroneously corresponding points. Accordingly, the stability of epipolar geometric calculation against image noise can be improved, and a three-dimensional shape can on the whole be reconstructed, as has been made clear by the results of the abovementioned experiment in which an image of an actual driving scene is used.

INDUSTRIAL APPLICABILITY

The object recognition apparatus according to the present invention is capable of stable recognition with a low computational load even when using epipolar geometry, and because the object recognition apparatus is capable of stable recognition even of objects with no surface texture, it can be applied in a variety of moving objects. In the case of being implemented in an automobile, the object recognition apparatus according to the present invention is particularly applicable in the detection of obstructions when parking, driving, and so on, and contributes to driver assistance.

BRIEF DESCRIPTION OF DRAWINGS

FIG. 7 A flowchart indicating a flow of recognition processing in an embodiment of an object recognition apparatus according to the present invention.

FIG. 8 A flowchart illustrating an epipolar geometric calculation routine.

FIG. 9 A flowchart illustrating a feature point tracking routine.

FIG. 10 A flowchart illustrating a correspondence check routine based on epipolar restriction.

FIGS. 14(a) and 14(b) An image Images illustrating a result of a three-dimensional reconstruction experiment.

FIGS. 15(a) and 15(b) An image Images illustrating a result of a three-dimensional reconstruction experiment.

Figure 1:
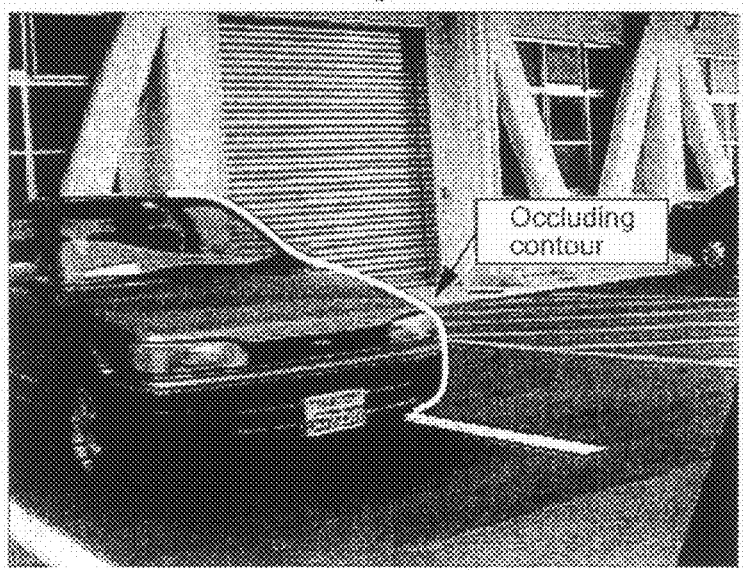
FIG. 1 A descriptive diagram illustrating an occluding contour.
Figure 2:
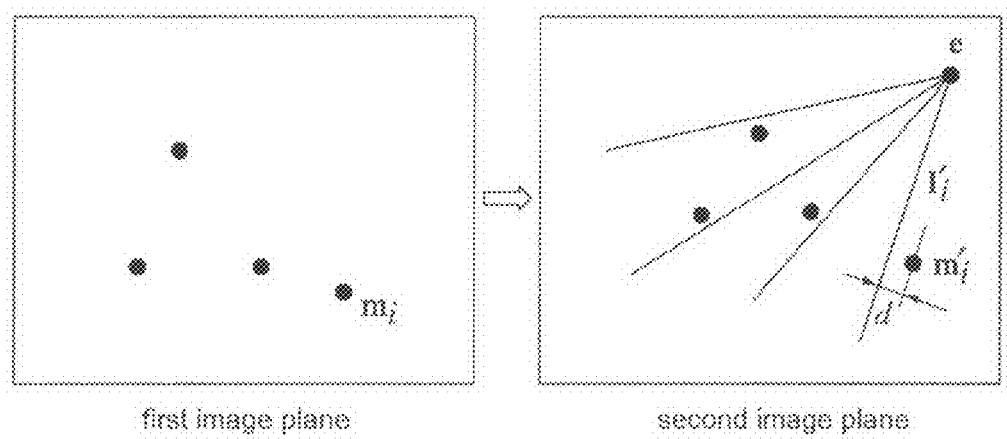
FIG. 2 A descriptive diagram illustrating the RANSAC method.
Figure 3:
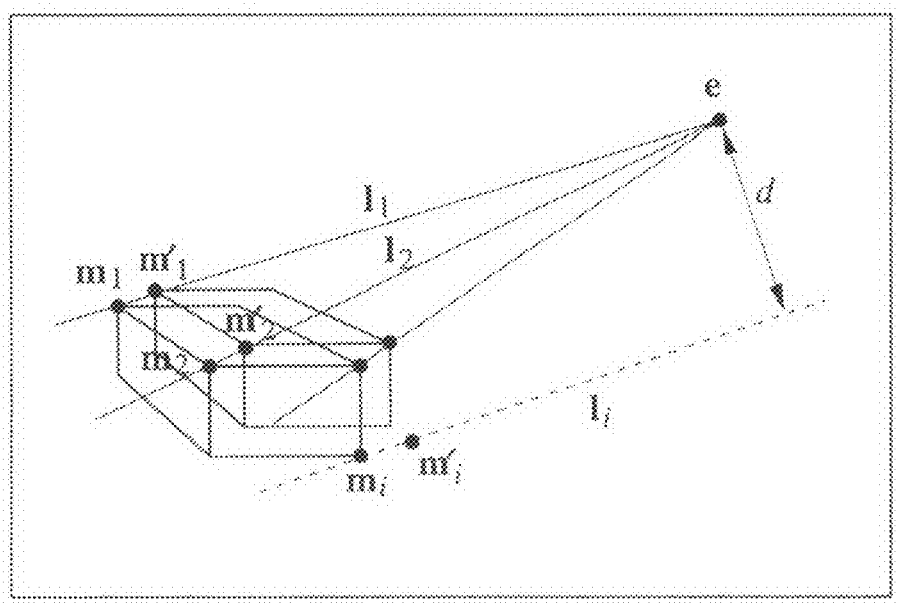
FIG. 3 A descriptive diagram illustrating erroneous correspondence elimination using auto-epipolar property.
Figure 4:
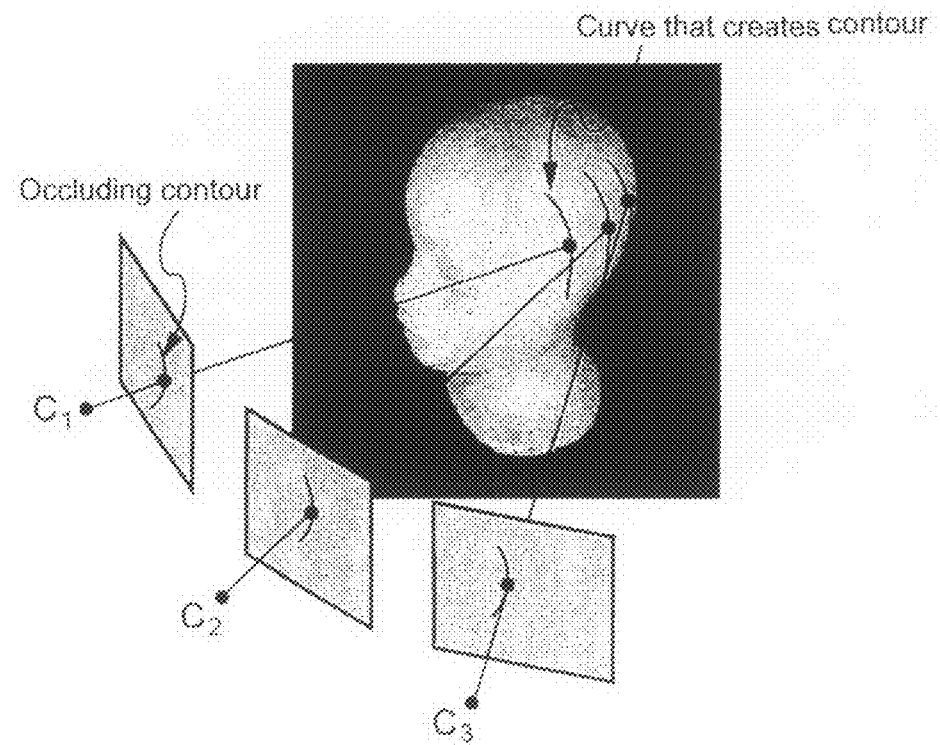
FIG. 4 A descriptive diagram illustrating occluding contours obtained from differing points of view.
Figure 5:
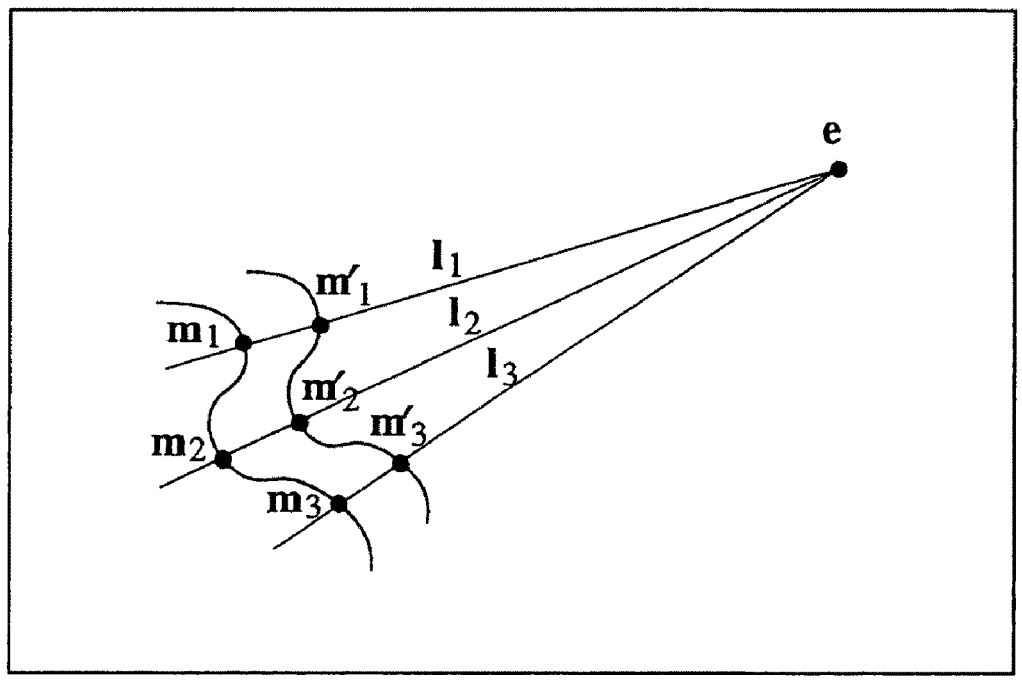
FIG. 5 A schematic showing auto-epipolar property and corresponding points on occluding contours.
Figure 6:
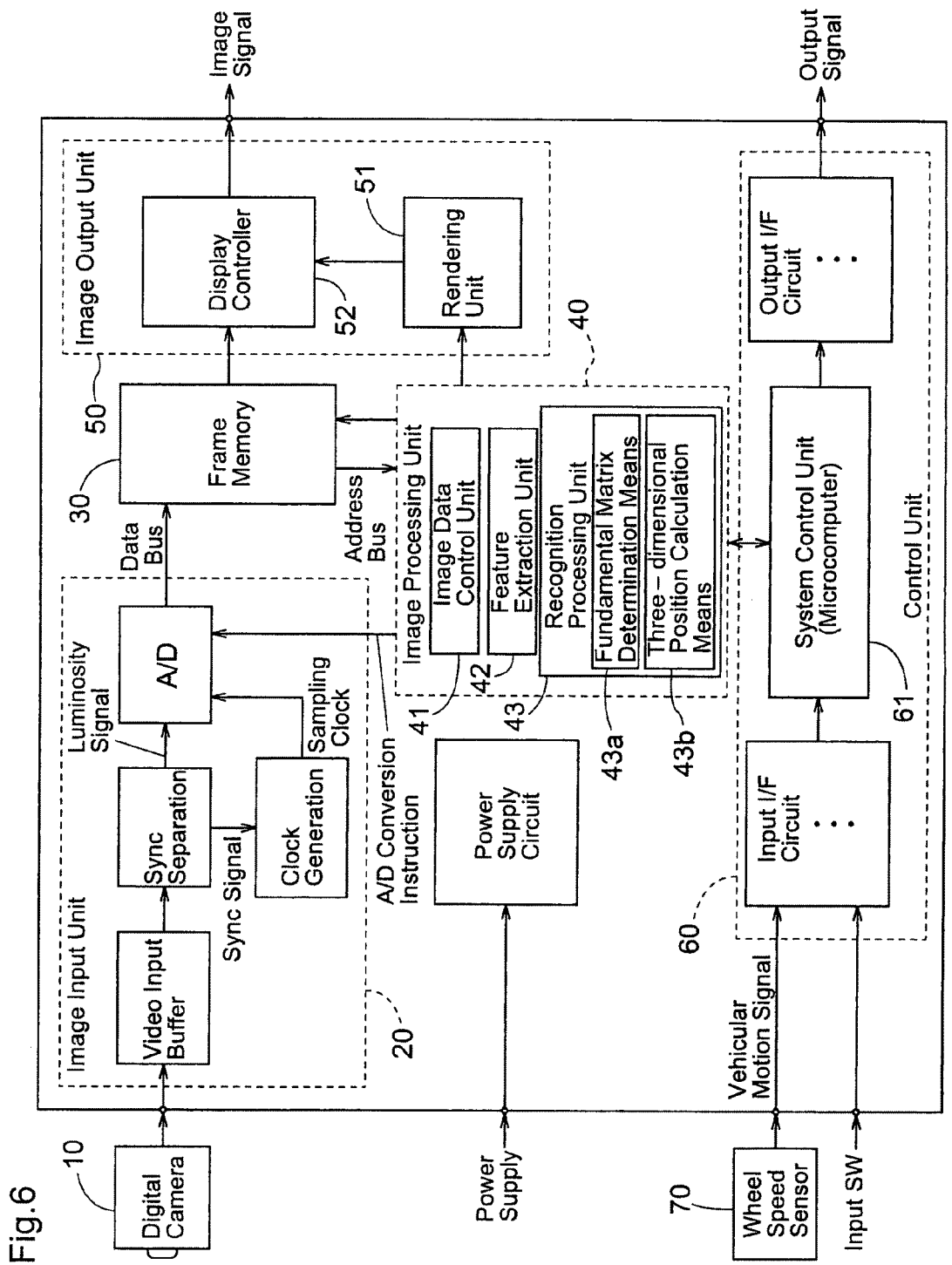
FIG. 6 A function block diagram illustrating an embodiment of an object recognition apparatus according to the present invention.
Figure 11:
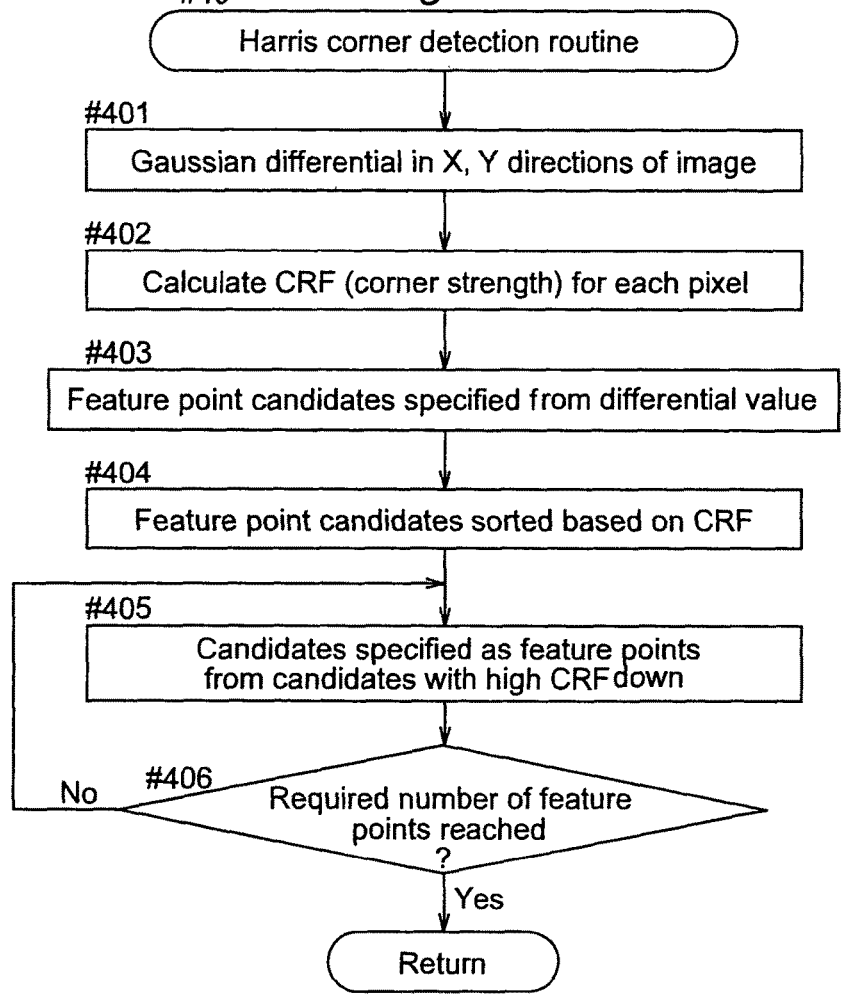
FIG. 11 A flowchart illustrating a Harris corner detection routine.
Figure 12:
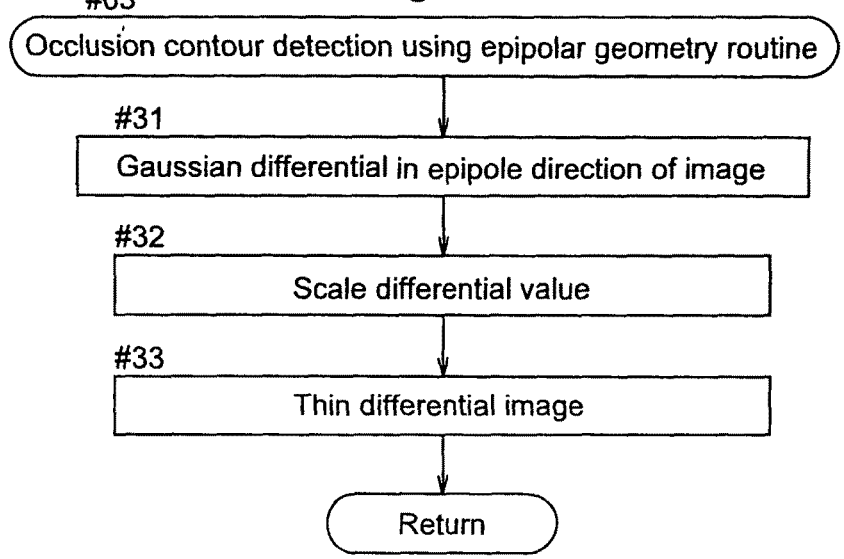
FIG. 12 A flowchart illustrating an occluding contour detection routine that uses epipolar geometry.
Figure 13:
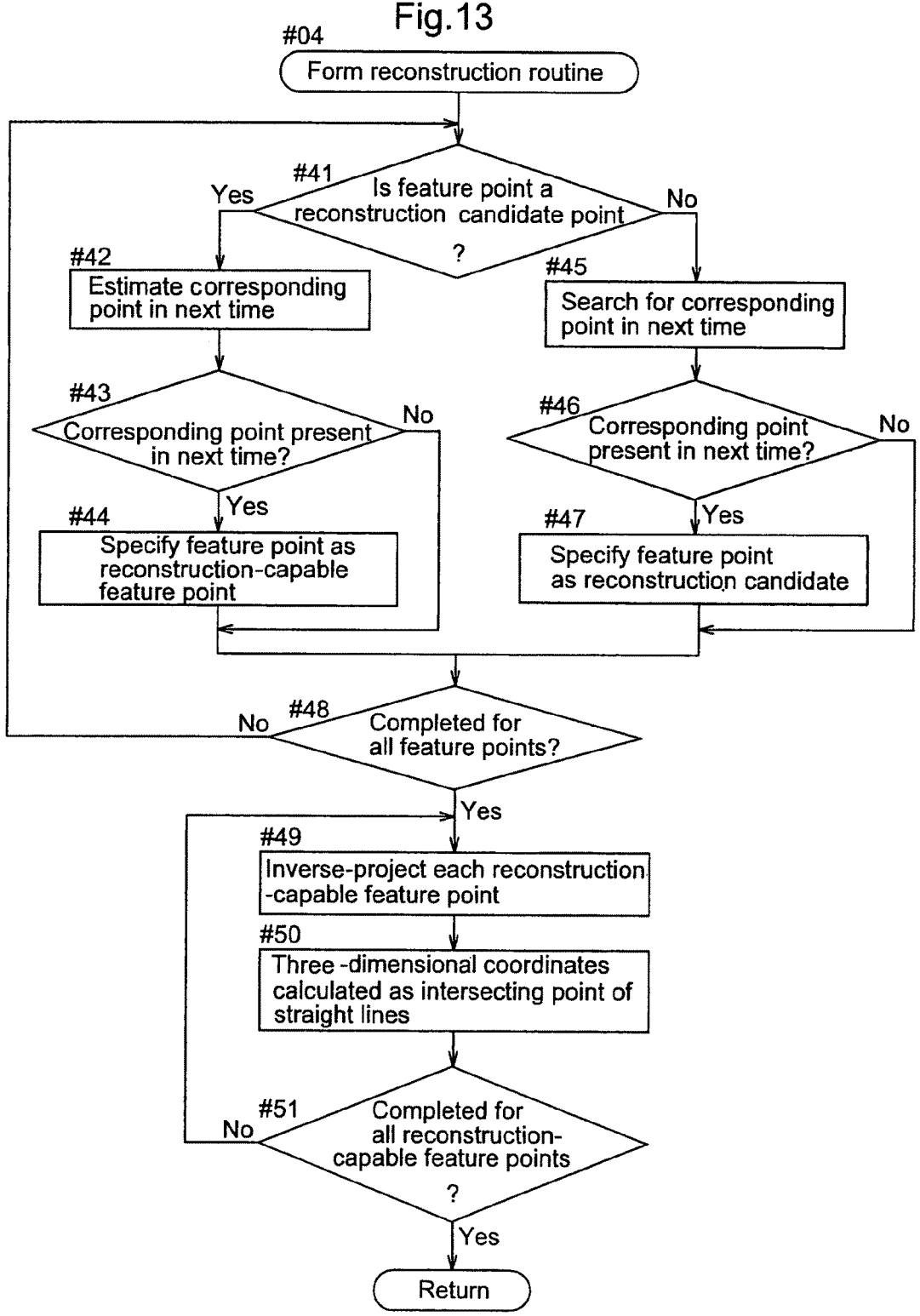
FIG. 13 A flowchart illustrating a shape reconstruction routine.

The invention claimed is:

1. An object recognition apparatus processing images, as acquired by an imaging means mounted on a moving object, in a first image plane and a second image plane having different points of view, and recognizing an object in the vicinity of the moving object, the object recognition apparatus comprising:
   a feature point detection means detecting feature points of an object image in the first image plane and the second image plane;
   a fundamental matrix determination means determining a fundamental matrix expressing a geometrically corresponding relationship, based on translational camera movement, between the first image plane and the second image plane, from not less than two pairs of feature points corresponding between the first image plane and the second image plane, on the basis of calculation of epipoles through auto-epipolar property; and
   a three-dimensional position calculation means calculating a three-dimensional position of the object based on the coordinates of the object in the first image plane and the second image plane and the determined fundamental matrix;
   wherein the fundamental matrix determination means generates temporary fundamental matrices, takes feature points in which the distance between a straight line connecting the feature points corresponding to one another in the first image plane and the second image plane and the epipole is less than or equal to a predetermined value as properly-corresponding feature points, and determines the temporary fundamental matrix in which the number of properly corresponding feature points is greatest as an official fundamental matrix.

2. The object recognition apparatus according to claim 1, wherein the feature point detection means detects an occluding contour of the object and detects points positioned on the contour lines of the occluding contour as the feature points.

3. The object recognition apparatus according to claim 1, wherein the epipole is found using the temporary fundamental matrix generated based on two pairs of corresponding feature points selected at random in the first image plane and the second image plane, a process for finding the discrete value of the properly-corresponding feature points found using the epipole is repeated a set number of times, and the temporary fundamental matrix in which the discrete value is greatest is determined as the official fundamental matrix.

4. The object recognition apparatus according to claim 1, wherein the moving object is an automobile, the object is a bumper of another automobile present in the vicinity of the automobile, and the feature point detection means detects an occluding contour of the bumper.

5. The object recognition apparatus according to claim 1, wherein the imaging means is configured of a single camera, and
   the first image plane and the second image plane are respectively created before and after translational movement of the camera, the translational movement resulting from movement of the moving object.

6. The object recognition apparatus according to claim 5, wherein evaluation of a state of movement of the camera is performed based on information from a moving object position information acquisition means provided in the moving object.

7. The object recognition apparatus according to claim 1, further comprising:
   a frame memory storing the images of the first image plane and the second image plane acquired by the imaging means; and
   an image processing portion detecting an occluding contour using epipolar geometry,
   wherein the image processing portion detects and tracks feature points of the object in an image read from the frame memory, and determines an essential matrix using an epipole found from the feature points based on epipolar geometric calculation.

8. The object recognition apparatus according to claim 7, wherein the image processing portion applies a Gaussian differential filter in the direction of the epipole on the images to be processed stored in the frame memory at the time of occluding contour detection.

9. An object recognition method for processing images, as acquired by an imaging means mounted on a moving object, in a first image plane and a second image plane having different points of view, and recognizing an object in the vicinity of the moving object, the object recognition method comprising:
   a step of detecting feature points of a object image in the first image plane and the second image plane;
   a step of determining a fundamental matrix expressing a geometrically corresponding relationship, based on translational camera movement, between the first image plane and the second image plane, from not less than two pairs of feature points corresponding between the first image plane and the second image plane, on the basis of calculation of epipoles through auto-epipolar property; and
   a step of calculating a three-dimensional position of the object based on the coordinates of the object in the first image plane and the second image plane and the determined fundamental matrix;
   wherein the step of determining a fundamental matrix includes generating temporary fundamental matrices, taking feature points in which the distance between a straight line connecting the feature points corresponding to one another in the first image plane and the second image plane and the epipole is less than or equal to a predetermined value as properly-corresponding feature points, and determining the temporary fundamental matrix in which the number of properly-corresponding feature points is greatest as an official fundamental matrix.

10. A non-transitory computer-readable medium storing an object recognition program that causes a computer to execute a function of processing images, as acquired by an imaging means mounted on a moving object, in a first image plane and a second image plane having different points of view, and recognizing an object in the vicinity of the moving object, wherein the object recognition program comprises: a function of detecting feature points of a object image in the first image plane and the second image plane; a function of determining a fundamental matrix expressing a geometrically corresponding relationship, based on translational camera movement, between the first image plane and the second image plane, from not less than two pairs of feature points corresponding between the first image plane and the second image plane, on the basis of calculation of epipoles through auto-epipolar property; and a function of calculating a three-dimensional position of the object based on the coordinates of the object in the first image plane and the second image plane and the determined fundamental matrix; wherein the function of determining a fundamental matrix includes generating temporary fundamental matrices, taking feature points in which the distance between a straight line connecting the feature points corresponding to one another in the first image plane and the second image plane and the epipole is less than or equal to a predetermined value as properly-corresponding feature points, and determining the temporary fundamental matrix in which the number of properly-corresponding feature points is greatest as an official fundamental matrix.

* * * * *